United States Patent [19]

Johnson

[11] 4,427,734

[45] Jan. 24, 1984

[54] WET PRESS FELT FOR PAPERMAKING MACHINES

[75] Inventor: Cary P. Johnson, Clifton Park, N.Y.

[73] Assignee: Albany International Corp., Albany, N.Y.

[21] Appl. No.: 369,367

[22] Filed: Apr. 19, 1982

[51] Int. Cl.³ .......................... B32B 5/06; B32B 5/26; D21F 7/08
[52] U.S. Cl. .............................. 428/234; 139/383 A; 162/358; 162/DIG. 1; 428/247; 428/286; 428/287; 428/300
[58] Field of Search .................. 162/DIG. 1, 358; 139/383 A; 428/234, 247, 286, 287, 300

[56] References Cited

U.S. PATENT DOCUMENTS 3,928,699 12/1975 Fekete .................... 162/DIG. 1

FOREIGN PATENT DOCUMENTS 691463 7/1964 Canada .................... 162/DIG. 1

Primary Examiner—James C. Cannon
Attorney, Agent, or Firm—Kane, Dalsimer, Kane, Sullivan & Kurucz

[57] ABSTRACT

The disclosure is of a new wet press felt for use on papermaking machines. The wet press felt of the invention comprises a conventional felt fabric having needled thereto a plurality of non-woven layers of synthetic, textile fibers. Interposed between the layers of synthetic textile fibers are mesh fabrics (4 to 32 mesh) which support the individual non-woven layers and retard compaction of the overall construction.

2 Claims, 1 Drawing Figure

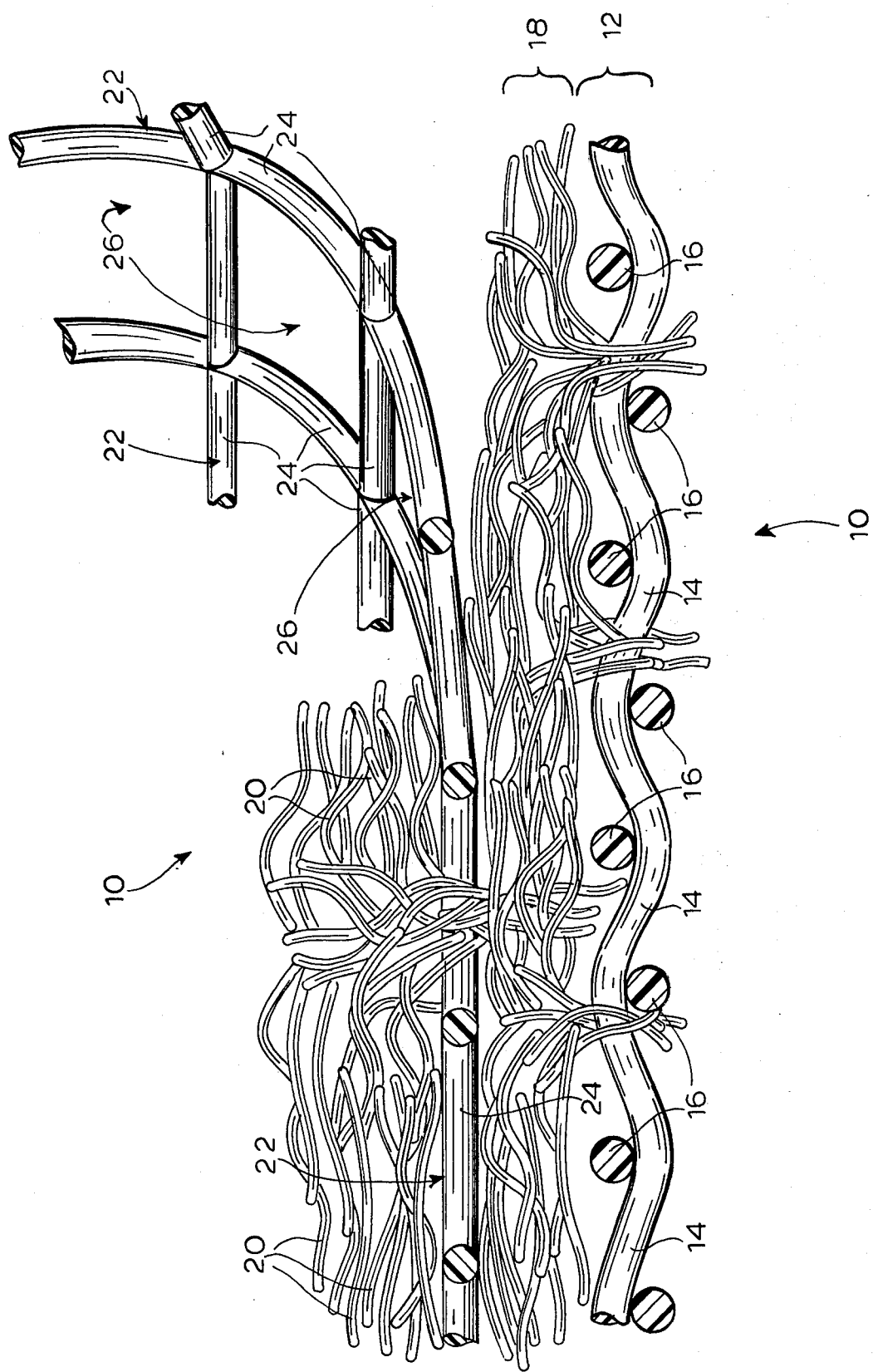

WET PRESS FELT FOR PAPERMAKING MACHINES

BACKGROUND OF THE INVENTION

1. Field of the Invention

The invention relates to papermaking machine clothing and more particularly relates to an improved wet press felt for use on papermaking machines.

2. Brief Description of the Prior Art

The prior art is replete with descriptions of wet press felts; see for example the descriptions given in U.S. Pat. Nos. 3,097,413; 3,365,766; 3,401,467; 3,613,258; 4,107,367; 4,162,190; and 4,187,618. However, the prior art wet press felts have not been completely satisfactory in all respects. For example, a popular wet press felt is the so-called "batt-on-mesh" construction. In this particular wet press felt construction, a base on an open mesh screen type of fabric, in almost any weave pattern, is made up of multifilament and sometimes monofilament yarns. To this base fabric there is needled in 100 percent synthetic, textile staple fibers. The needling is accomplished in consecutive steps, as a plurality of webs or batts of the non-woven fibers are individually laid down on the base and needled in. Any desired thickness, weight and water permeability is achieved by the density of the webs or batts needled in. Although this type of wet press felt in widely employed and used, over a period of time it's usefulness deteriorates as compaction of the felt will occur, i.e.; a reduction in thickness and water permeability due to the repeated passage of the felt through the nip of the wet press rollers. The degree to which the felt will resist compaction during its use diminishes with time and use. As compaction of the felt occurs, the life of the felt shortens until the felt resists drainage of water through the felt. This, of course, reduces the efficiency of the papermaking machine and necessitates replacement of the felt with a new, uncompacted felt.

The wet press felt of the present invention resists compacting longer than the prior art wet press felts described above and therefore has a longer life in comparison to such prior art felts.

SUMMARY OF THE INVENTION

The invention comprises a wet press felt for use on a papermaking machine, which comprises;

a base fabric of interwoven, textile yarns;

a plurality of non-woven, layers of synthetic textile fibers, each layer being attached to adjacent layers and collectively to the base fabric, by needling; and a layer of a mesh fabric (4 to 32 mesh) interposed between adjacent layers of the non-woven textile fibers, said mesh being made of a synthetic, polymeric resin.

The term "mesh fabric" as used herein means a fabric characterized by open spaces between the yarns, including woven, knit, lace, net, crochet and like fabrics. In the preferred embodiments of the invention, the mesh fabrics employed are fabricated by extrusion or like techniques to obtain mesh fabrics of thermoplastic resins such as polypropylene, polyethylene and the like.

BRIEF DESCRIPTION OF THE DRAWING

The accompanying drawing is cross-sectional, side elevation of a portion of an embodiment wet press felt of the invention, partially peeled back to show its internal structure.

DETAILED DESCRIPTION OF THE PREFERRED EMBODIMENTS OF THE INVENTION

The accompanying drawing is a cross-sectional, side elevation of a portion of an embodiment wet press felt 10 of the invention, partially peeled back to show its internal construction. The embodiment felt 10 comprises a base fabric 12 of interwoven lengthwise yarns 14 and crosswise or filling yarns 16. The yarns 14, 16 may be any conventional textile yarns such as mono, multifilament, or spun yarns of natural or synthetic textile fibers. Representative of such yarns are monofilaments of polyolefins such as polyethylene, polypropopylene and the like, polyacrylics, polyamides, polyimides, polyesters and the like. Also representative of the yarns 14, 16 are multifilament or spun yarns of wool, polyesters, polyamides, polyacrylics, blends thereof and the like.

In the drawing, the yarns 14, 16 are shown in a simple, single layer weave. However, those skilled in the art will appreciate that the base fabric 12 may be fabricated in any conventional weave, simple or complex, single or multilayered as conventionally known.

As also shown in the drawing, the base fabric 12 has been structurally integrated with a non-woven batt 18 of textile fibers attached to the base fabric 12 by needling. Needling is a well-known technique for consolidating and stabilizing felt structures; see for example the technique and apparatus for needling textiles described in the U.S. Pat. No. 2,059,132. The non-woven batt 18 needled to base fabric 12 may be made up of any conventional textile fibers. Representative of such non-woven textile fibers are staple fibers of polyesters, polyolefins, polyamides and the like.

The needled composite of base fabric 12 and batt 18 by themselves may constitute a wet press fabric of the prior art provided it is prepared in any of the conventional weights and thicknesses employed for wet press felts. More likely, the non-woven component is applied in a plurality of layers which comprise relatively thin, lower weight batts of non-woven fibers.

As shown in the accompanying drawing, there is adhered to the outer surface of the non-woven batt 18 another layer 20 of non-woven, textile fibers which may be similar to those found in batt 18 or they may be different in composition. The adherence of layer 20 to batt 18 is also by needling. Interposed between the two adjacent layers 18, 20 of non-woven fibrous materials is a mesh fabric 22. The mesh fabric 22 and layer 20 are partially peeled back in the drawing to show this construction. The mesh fabric 22 is a net-like structure of ribs or yarns 24 separated by mesh 26. The mesh fabric 22 has a mesh count of from 4 to 32. Mesh fabrics are widely known as is the method of their preparation. The British Pat. Nos. 1,293,456 and 1,427,281 as well as U.S. Pat. No. 3,488,415 describe the manufacture of representative mesh fabrics from synthetic, polymeric resins such as polypropylene, polyethylene and the like. Mesh fabrics such as those described above are particularly preferred in the present invention.

For simplicity, the embodiment fabric 10 described in the accompanying drawings shows only two non-woven fibrous batts with one interposed mesh fabric needled to the underlying base fabric 12. However, those skilled in the art will appreciate that any number of non-woven fibrous batts such as the batts 18, 20 may be built up by needling, with interposed mesh fabrics such as the mesh fabric 22 to obtain a desired wet press felt of a particular thickness, density and water permeability. This particular construction, wherein a mesh fabric is interposed between adjacent layers of the non-woven fibrous material, is one which resists compaction dramatically, in comparison to a similar fabric wherein the non-fibrous layers are built up without an intervening mesh fabric.

The wet press felts of the invention are of course employed in an endless form. The fabric constituting the felt 10 may be made endless by any conventional method for seaming ends together. When made endless, the wet press felts of the invention are mounted in the wet press section of a conventional papermaking machine for use thereon.

The following examples describe the manner and process of making and using the invention and set forth the best mode contemplated by the inventor of carrying out the invention, but are not to be construed as limiting.

EXAMPLE 1

A felt fabric was made, employing a base fabric of plied monofilament lengthwise yarns and single monofilament crosswise yarns in a single layer weave. To this base a layer of non-woven web was applied to the back side and the face side. Then, to the face side was applied a layer of mesh material, in this case a polypropylene monofilament mesh with 7.25 strands lengthwise and 6.5 strands crosswise. Another layer of web was then applied, followed by more mesh material and another layer of web. This was repeated five times and at the end two additional layers of web were applied.

The resulting fabric was tested for physical properties. The test results were as follows:

| Test Results | | |
|---|---|---|
| Weight | | 5.02 oz/sq. ft. |
| Permeability | | 58 CFM |
| Caliper | 2 psi | .128" |
| | 500 psi | .088" |
| % Void Volume | 2 psi | 57.4% |
| | 500 psi | 38.1% |
| Volume of Voids | 2 psi | 10.582 cu in/sq. ft. felt |
| | 500 psi | 4.822 cu in/sq. ft. felt |

The above caliper, % Void Volume and Volume of Voids test results are on the felt sample after "breaking the felt in" with 500 cycles of 500 psi pressure. The above results are taken from the 500th cycle.

EXAMPLE 2

This example is not an example of the invention but is made for comparative purposes.

A felt was manufactured in the same manner and construction as the felt in Example 1, but without the mesh materials. It would be considered a typical batt-on-mesh fabric, the test data on this fabric was as follows:

| | | |
|---|---|---|
| Weight | | 4.63 oz/sq. ft. |
| Permeability | | 60 CFM |
| Caliper | 2 psi | .111" |
| | 500 psi | .077" |
| % Void Volume | 2 psi | 55.5% |
| | 500 psi | 35.9% |
| Volume of Voids | 2 psi | 8.872 cu in/sq. ft. felt |
| | 500 psi | 3.976 cu in/sq. ft. felt |

Again, the Caliper, % Void Volume and Volume of Voids figures are the results after "breaking the felt in" 500 cycles at 500 psi pressure. These results are taken from the 500th cycle.

Those skilled in the art, observing the physical properties of the fabrics prepared in Examples 1 and 2 will appreciate that with the addition of the scrim material, as expected, the weight and caliper increased; the permeability remained approximately the same. The fact that the thickness is greater in Example 1 under compression shows that the scrim material is supporting the web and preventing the web from compacting. This is also shown in the % Void Volume and Volume of Voids results, both of which have been increased with the use of the scrim material.

The Volume of Voids per square foot of felt figure is very important. With the use of the scrim material the Volume of Voids under compression (500 psi) increased from 3.976 cu in/sq. foot of felt to 4.822 cu in/sq. ft. of felt, a 21.3% increase. This gives additional space for the water from the sheet of paper to go and also will reduce the resistance to water flow through the fabric which is also very imortant, when the fabric is employed as a wet press felt.

Those skilled in the art will appreciate that the invention can be used to improve the efficiency of a wet press section of a papermaking machine.

Although the base 12 has been described above in the preferred embodiment of the invention as a single, simple weave, those skilled in the art will appreciate that double or triple layers in any weave pattern may be employed, using monofilaments, multifilaments or spun yarns or combinations of yarns.

What is claimed:

1. A wet press felt for use on a papermaking machine, which comprises;
    a base fabric of interwoven textile yarns;
    a plurality of non-woven layers of synthetic, textile fibers each of which is attached to an adjacent layer and collectively to the base fabric by needling; and
    a layer of a monofilament mesh fabric (4 to 32 mesh) interposed between and attached by needling to the faces of adjacent layers of the non-woven textile opposed to those attached to the base fabric fibers, said mesh being made of a synthetic, polymeric resin.
2. The felt of claim 1 made endless.

* * * * *

UNITED STATES PATENT AND TRADEMARK OFFICE
CERTIFICATE OF CORRECTION

PATENT NO. : 4,427,734
DATED : January 24, 1984
INVENTOR(S) : Cary P. Johnson

It is certified that error appears in the above—identified patent and that said Letters Patent is hereby corrected as shown below:

Col. 1. line 19; the word "on" should read -- of --

Col. 1, line 28; the word "in" should read -- is --

Col. 4, Claim 1, line 11; before the word "opposed" insert the word -- fibers --

Col. 4, Claim 1, line 11, after "fabric" the word "fibers" should be deleted.

Signed and Sealed this

Fourth Day of September 1984

[SEAL]

Attest:

GERALD J. MOSSINGHOFF

Attesting Officer

Commissioner of Patents and Trademarks